(12) United States Patent
Ohta

(10) Patent No.: US 9,735,698 B2
(45) Date of Patent: Aug. 15, 2017

(54) METHOD OF CONTROLLING POWER CONVERSION APPARATUS

(71) Applicant: DAIKIN INDUSTRIES, LTD., Osaka-Shi, Osaka (JP)

(72) Inventor: Keisuke Ohta, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/117,597

(22) PCT Filed: Feb. 16, 2015

(86) PCT No.: PCT/JP2015/054092
§ 371 (c)(1),
(2) Date: Aug. 9, 2016

(87) PCT Pub. No.: WO2015/125724
PCT Pub. Date: Aug. 27, 2015

(65) Prior Publication Data
US 2016/0359423 A1    Dec. 8, 2016

(30) Foreign Application Priority Data

Feb. 19, 2014    (JP) ................................ 2014-029381

(51) Int. Cl.
*H02M 5/458*    (2006.01)
*H02M 1/12*    (2006.01)
(Continued)

(52) U.S. Cl.
CPC ............. *H02M 5/458* (2013.01); *H02M 1/12* (2013.01); *H02M 1/14* (2013.01); *H02P 6/08* (2013.01); *H02P 27/06* (2013.01)

(58) Field of Classification Search
CPC .......... H02P 6/08; H02P 27/06; H02M 5/458; H02M 5/4585; H02M 1/12; H02M 1/14;
(Continued)

(56) References Cited

U.S. PATENT DOCUMENTS 6,166,929 A * 12/2000 Ma ............................ H02P 5/74
363/37
7,907,427 B2   3/2011 Sakakibara et al.
(Continued)

FOREIGN PATENT DOCUMENTS

JP    4067021 B2    3/2008

*Primary Examiner* — Gustavo Rosario Benitez
(74) *Attorney, Agent, or Firm* — Birch, Stewart, Kolasch & Birch, LLP

(57) ABSTRACT

A voltage of a reactor taking a potential on a side of a capacitor as a reference is detected. A correction coefficient which is made smaller as a first voltage control rate command becomes smaller is calculated, the first voltage control rate being a ratio of an amplitude of an AC voltage, which is outputted by a power converter, to an average value of the DC voltage. A correction is made to subtract a correction amount obtained by multiplying the voltage of the reactor by the correction coefficient from the first voltage control rate command, so that a second voltage control rate command is generated. A switching signal which is generated based on a second voltage control rate command is given to the power converter.

9 Claims, 8 Drawing Sheets

(51) Int. Cl.
*H02P 27/06* (2006.01)
*H02P 6/08* (2016.01)
*H02M 1/14* (2006.01)

(58) Field of Classification Search
CPC ............ H02M 7/48; H02M 5/40; H02M 5/42; H02M 5/44; H02M 5/453; H02M 2001/003; H02M 2001/0022
See application file for complete search history.

(56) References Cited

U.S. PATENT DOCUMENTS

| | | | | |
|---|---|---|---|---|
| 8,269,370 B2* | 9/2012 | Haga | .................... | H02M 1/12 307/151 |
| 2004/0232876 A1* | 11/2004 | Matsushiro | ........... | H02P 27/045 318/801 |
| 2004/0232877 A1* | 11/2004 | Kawaji | ................ | H02P 27/045 318/802 |
| 2011/0038192 A1* | 2/2011 | Kawashima | ........ | H02M 1/4233 363/127 |
| 2011/0043150 A1* | 2/2011 | Ogawa | ................ | H02M 5/458 318/400.26 |
| 2015/0256095 A1* | 9/2015 | Ohta | .................. | H02M 7/4826 363/37 |

* cited by examiner

F I G. 1 5
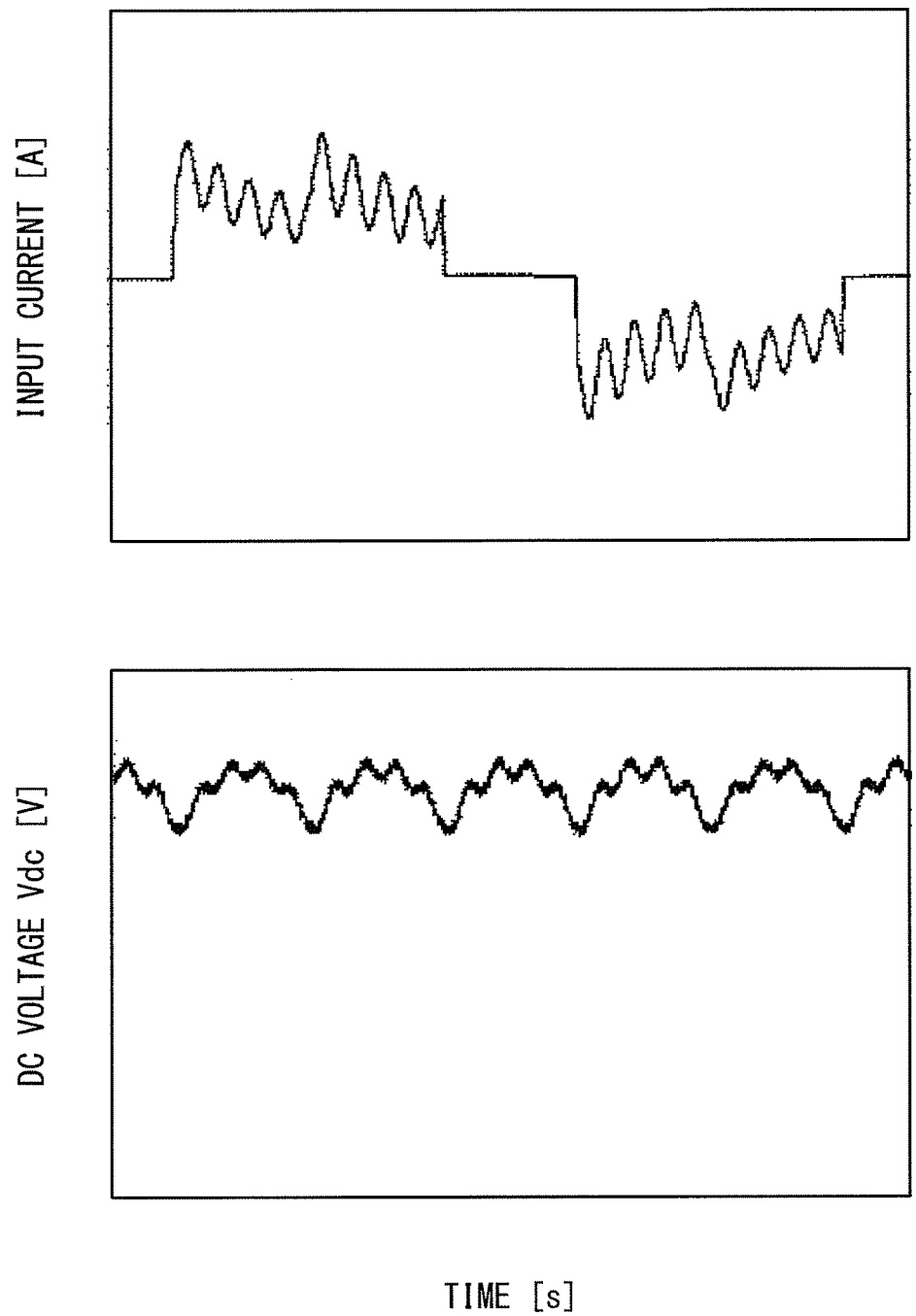

METHOD OF CONTROLLING POWER CONVERSION APPARATUS

TECHNICAL FIELD

The present disclosure relates to a method of controlling a power conversion apparatus, and for example, a controller for a capacitor-less inverter.

BACKGROUND ART

Japanese Patent No. 4067021 describes an electric motor controller. The electric motor controller has a converter and an inverter. The converter and the inverter are connected to each other through a DC link. The converter inputs thereto an AC (alternating current) voltage, performs a full-wave rectification thereon for conversion, and outputs a DC (direct current) voltage to the DC link. The inverter inputs thereto the DC voltage and performs conversion to output an AC voltage to an electric motor.

Further, the DC link is provided with an LC filter having a reactor and a capacitor. In more detail, the capacitor and the reactor are connected in series to each other between a pair of output ends of the converter, and a voltage across both ends of the capacitor is inputted to the inverter as the DC voltage. A capacitance of the capacitor is smaller than that of a so-called smoothing capacitor, and the voltage across both ends of the capacitor has a pulsating component caused by the full-wave rectification.

In Japanese Patent No. 4067021, in order to reduce a harmonic component of DC voltage caused by resonance of the LC filter, the inverter is controlled on the basis of a voltage across both ends of the reactor. For example, a correction of subtracting a value, obtained by multiplying the voltage of the reactor by a gain, from an initial value for a voltage control rate of the inverter is made to calculate a target value of a voltage control rate command. Then, a switching signal to the inverter is generated on the basis of the target value of the voltage control rate and a voltage command value calculated by a known method. This reduces the harmonic component of the voltage across both ends of the capacitor and further reduces distortion of the current to be inputted to the electric motor controller. The control based on a reactor voltage is referred to also as a "VL control system" in the present application.

SUMMARY OF INVENTION

Problems to be Solved by the Invention

When the initial value of the voltage control rate is small, the gain is relatively large. That is to say, a ratio of the gain to the initial value of the voltage control rate increases. Too large ratio may cause an instability of a VL control system.

Then, it is an object of the present disclosure to provide a method of controlling a power conversion apparatus, which is capable of suppressing an instability of a VL control system caused by an increase in a ratio of a gain to a voltage control rate.

Means for Solving the Problems

The present disclosure is intended for a method of controlling a power conversion apparatus which includes a first power supply line (LH) and a second power supply line (LL), a rectifier (1) for rectifying an inputted first AC voltage into a DC voltage to output the DC voltage to between the first power supply line and the second power supply line, a capacitor (C1) provided between the first power supply line and the second power supply line, a reactor (L1) constituting an LC filter, together with the capacitor, and a power converter (2) for converting a DC voltage (Vdc) supported by the capacitor into a second AC voltage based on a switching signal (S) to be inputted and then applying the second AC voltage to a load to flow an alternating current. According to a first aspect of the present disclosure, the method of controlling the power conversion apparatus includes steps of detecting a voltage (VL) of the reactor taking a potential on a side of the capacitor as a reference; when at least a first voltage control rate command (ks**) which is a ratio of an amplitude of the second AC voltage to an average value of the DC voltage is smaller than a predetermined value, calculating a correction coefficient which is made smaller as the first voltage control rate command becomes smaller;

making a correction on the first voltage control rate command to subtract a correction amount (H) obtained by multiplying the voltage of the reactor by the correction coefficient, thereby generating a second voltage control rate command (ks**); and giving the switching signal which is generated based on the second voltage control rate command to the power converter.

According to a second aspect of the present disclosure, in the method of controlling the power conversion apparatus of the first aspect, when the first voltage control rate command is larger than the predetermined value, the correction coefficient is calculated to be made larger as the amplitude of the alternating current becomes smaller.

According to a third aspect of the present disclosure, in the method of controlling the power conversion apparatus of the second aspect, when the first voltage control rate command is larger than the predetermined value, the correction coefficient is inversely proportional to the amplitude of the alternating current.

According to a fourth aspect of the present disclosure, in the method of controlling the power conversion apparatus of any one of the first to third aspects, when the correction amount is larger than a positive upper limit value, the correction amount is limited to the upper limit value, and when said correction amount is smaller than a negative lower limit value, the correction amount is limited to the lower limit value, and absolute values of the upper limit value and lower limit value are made larger as the first voltage control rate command becomes larger.

According to a fifth aspect of the present disclosure, in the method of controlling the power conversion apparatus of the fourth aspect, the upper limit value or the lower limit value is proportional to the first voltage control rate command.

Effects of the Invention

In the method of controlling a power conversion apparatus according to the first aspect of the present disclosure, the correction amount obtained by multiplying the voltage of the reactor by the correction coefficient is subtracted from the first voltage control rate command, so that this correction coefficient functions as a gain when the reactor voltage is fed back.

The first voltage control rate command is made small as the amplitude of the alternating current becomes small, and the correction coefficient is also made small as the amplitude of the alternating current becomes small.

Accordingly, an increase in a ratio of the correction coefficient (gain) to the first voltage control rate command can be suppressed, thus the instability of the control can be suppressed.

In the method of controlling a power conversion apparatus according to the second aspect of the present disclosure, when the amplitude of the alternating current is large, the first voltage control rate command is also set to be large, so that when the amplitude of the alternating current is larger than the predetermined value, the ratio of the gain to the first voltage control rate command is less large compared with the case where the alternating current is smaller than the predetermined value. Accordingly, the instability of the control due to the excessive gain does not easily occur.

In the meanwhile, when the amplitude of the alternating current is larger than the predetermined value, a transfer gain of a VL control system increases in accordance with the increase in the amplitude of the alternating current (described in detail in the embodiment), and accordingly, a gain margin decreases and the instability of the control may occur.

According to the second aspect of the present disclosure, when the amplitude of the alternating current is larger than the predetermined value, the correction coefficient is calculated to be made larger as the amplitude of the alternating current becomes smaller. Accordingly, a variation of the gain of the VL control system due to a variation of the amplitude of the alternating current can be suppressed, so that instability of the load can be suppressed (described in detail in the embodiment).

In the method of controlling a power conversion apparatus according to the third aspect of the present disclosure, the variation of the gain due to the variation of the amplitude of the alternating current can be theoretically resolved.

In the method of controlling a power conversion apparatus according to the fourth aspect of the present disclosure, the ratio of the correction amount to the first voltage control command can be prevented from becoming too large (exceeding the upper limit value).

In the method of controlling a power conversion apparatus according to the fifth aspect of the present disclosure, the upper limit value or the lower limit value can be easily generated.

These and other objects, features, aspects and advantages of the present disclosure will become more apparent from the following detailed description of the present disclosure when taken in conjunction with the accompanying drawings.

BRIEF DESCRIPTION OF DRAWINGS

FIG. 15 is a view showing exemplary input current and direct current.

DESCRIPTION OF EMBODIMENT(S)

The First Embodiment

<1. Configuration of Power Conversion Apparatus>

Figure 1:
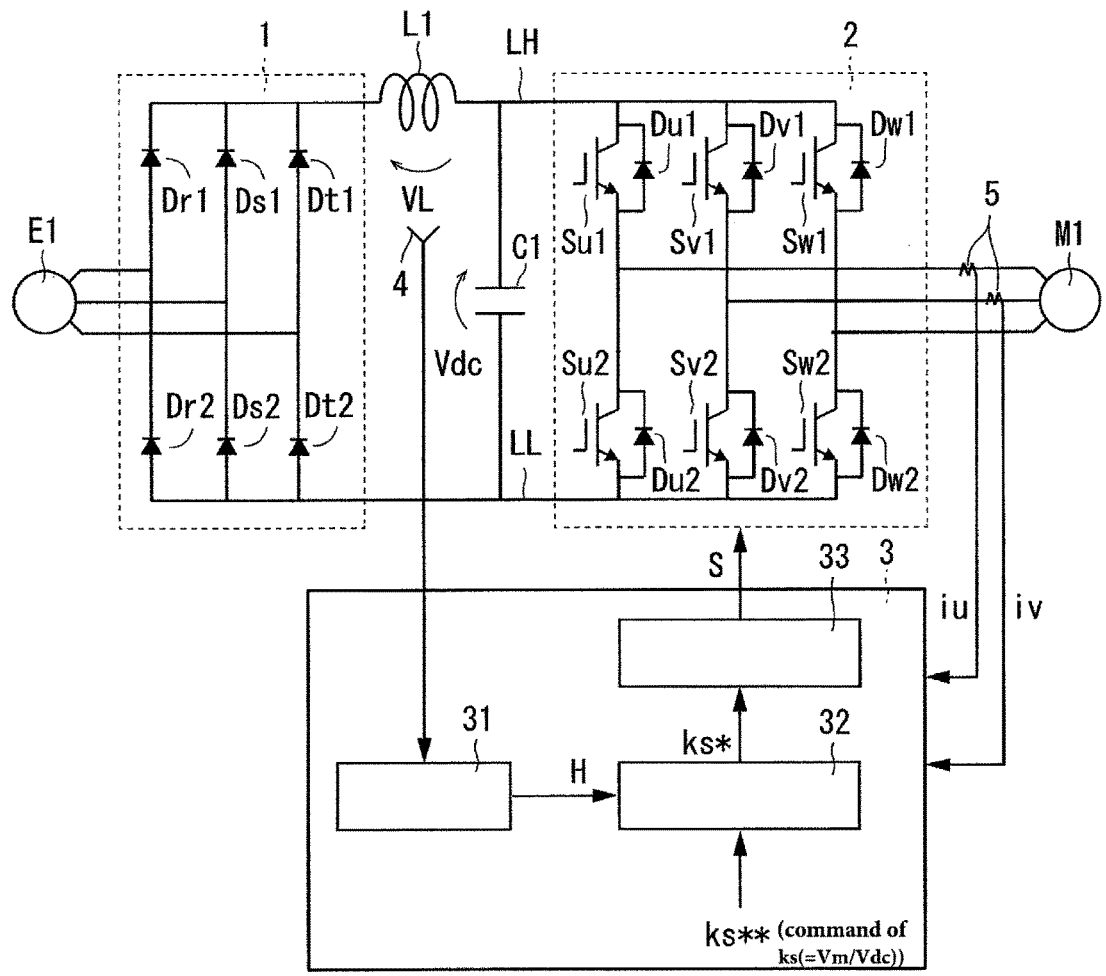
FIG. 1 is a view showing an exemplary conceptual configuration of a power conversion apparatus.

As shown in FIG. 1, a present power conversion apparatus includes a rectifier 1, a capacitor C1, a reactor L1, and a power converter 2.

The rectifier 1 converts an N-phase AC (alternating current) voltage (N: natural number) inputted from an AC (alternating current) power supply E1 into a DC (direct current) voltage and outputs the DC voltage to between DC (direct current) lines (power supply lines) LH and LL. In the exemplary case of FIG. 1, the rectifier 1 is a diode rectifier circuit. The rectifier 1 is not limited to the diode rectifier circuit but may be a separately-excited rectifier circuit or a self-excited rectifier circuit. As the separately-excited rectifier circuit, for example, a thyristor bridge rectifier circuit can be adopted, and as the self-excited rectifier circuit, a PWM (Pulse-Width-Modulation) AC-DC converter can be adopted.

Further, in the exemplary case of FIG. 1, the rectifier 1 is a three-phase rectifier circuit to which a three-phase AC voltage is inputted. The number of phases of the AC voltage to be inputted to the rectifier 1, i.e., the number of phases of the rectifier 1, however, is not limited to three but may be set as appropriate.

The capacitor C1 is provided between the DC lines LH and LL. The capacitor C1 is, for example, a film capacitor. Such a capacitor C1 is cheaper than an electrolytic capacitor. On the other hand, the capacitance of the capacitor C1 is smaller than that of the electrolytic capacitor, so that the capacitor C1 cannot sufficiently smooth the DC voltage Vdc between the DC lines LH and LL. In other words, the capacitor C1 allows the pulsation of a rectified voltage which is rectified by the rectifier 1. Therefore, the DC voltage Vdc has a pulsating component caused by the rectification of the N-phase AC voltage (a pulsating component having a frequency which is 2N times as high as that of the N-phase AC voltage in case of using the full-wave rectification, for example). In the exemplary case of FIG. 1, since the three-phase AC voltage is full-wave rectified, the DC voltage Vdc pulsates at a frequency which is six times as high as that of the three-phase AC voltage.

The reactor L1 constitutes an LC filter, together with the capacitor C1. In the exemplary case of FIG. 1, the reactor L1 is provided in the DC line LH or LL (in the exemplary case of FIG. 1, in the DC line LH) on the side of the rectifier 1 from the capacitor C1. The location of the reactor L1 is not limited to this, but the reactor L1 may be provided on the side of the input of the rectifier 1.

The reactor L1 and the capacitor C1, which are connected in series to each other between a pair of output ends of the AC power supply E1, constitute a so-called LC filter. When the capacitance of the capacitor C1 is small as described above, a resonance frequency of this LC filter tends to be higher. Similarly, as the inductance of the reactor L1 is made smaller, the resonance frequency tends to become still higher. In a case, for example, where the capacitance of the capacitor C1 is 40 μF and the inductance of the reactor L1 is 0.5 mH in FIG. 1, the resonance frequency is about 1.125 kHz.

The power converter 2 is, for example, a voltage type inverter and inputs thereto the DC voltage Vdc between the DC lines LH and LL (the DC voltage supported by the capacitor C1). Then, the power converter 2 converts the DC voltage Vdc into an AC voltage on the basis of a switching signal S from a controller 3 and outputs the AC voltage to a load M1. Hereinafter, the AC voltage outputted from the power converter 2 is also referred to as an output voltage.

In FIG. 1, for example, the power converter 2 has three pairs of switching units (for three phases), each pair of which are connected in series to each other between the DC lines LH and LL. In the exemplary case of FIG. 1, a pair of switching units Sup and Sun are connected in series to each other, another pair of switching units Svp and Svn are connected in series to each other, and still another pair of switching units Swp and Swn are connected in series to each other. Then, a node between a pair of switching units Sxp and Sxn (x represents any one of u, v, and w, the same applies to the following) for each phase is connected to the load M1 through an output line Px. When these switching units Sxp and Sxn become conducting/nonconducting on the basis of an appropriate switching signal, the power converter 2 converts the DC voltage Vdc into a three-phase AC voltage and outputs the AC voltage to the load M1. Accordingly, the alternating current flows through the load M1.

The load M1 may be, for example, a rotary machine (e.g., an induction machine or a synchronous machine). Though the three-phase load M1 is shown in the exemplary case of FIG. 1, the number of phases is not limited to three. In other words, the power converter 2 is not limited to a three-phase power converter.

<2. Control>

Herein, the control over the power converter 2 is performed by introducing a voltage control rate ks. The above voltage control rate ks refers to a ratio of an amplitude Vm of the output voltage from the power converter 2 to the DC voltage Vdc (=Vm/Vdc). In other words, the voltage control rate ks indicates a ratio at which the AC voltage is outputted with respect to the DC voltage Vdc.

Since the power converter 2 performs a switching operation, the DC voltage Vdc varies with the switching. In other words, a harmonic component is generated in the DC voltage Vdc. Further, since a switching frequency is higher than the frequency of the pulsation of the DC voltage Vdc (hereinafter, referred to also as a pulsation frequency) caused by the rectification, the frequency of the harmonic component which is described herein is higher than the pulsation frequency. Furthermore, the present power conversion apparatus has the LC filter constituted of the capacitor C1 and the reactor L1 as described above. Therefore, as the switching frequency becomes closer to the resonance frequency of the LC filter, the range of variation in the harmonic component of the DC voltage Vdc in the capacitor C1 increases.

Such a harmonic component of the DC voltage Vdc is not desirable because the harmonic component invites, for example, a harmonic component of an alternating current to be inputted to the rectifier 1.

Then, in order to reduce the harmonic component of the DC voltage Vdc, the voltage control rate ks is corrected. In more detail, a correction is made so that the voltage control rate ks can increase as the harmonic component of the DC voltage Vdc becomes larger. With this correction, the amplitude Vm of the output voltage increases as the harmonic component of the DC voltage Vdc becomes higher. Thereby, since the output power of the power converter 2 becomes higher, the DC voltage Vdc decreases. Therefore, the harmonic component of the DC voltage Vdc can be reduced.

Such a correction is made on the basis of a voltage VL supported by the reactor L1. The reason is that when the N-phase AC voltage to be inputted to the rectifier 1 is assumed to be an ideal voltage source, it can be considered that the harmonic component of the DC voltage Vdc appears as the voltage VL. The harmonic component which appears in the voltage VL, however, is in phase or in opposite phase with the harmonic component of the DC voltage Vdc, depending on how to take a reference potential of the voltage VL. When the potential on the side of the capacitor C1 of the reactor L1 in FIG. 1 is taken as a reference, for example, a harmonic component in opposite phase with the harmonic component of the DC voltage Vdc appears in the voltage VL. When the potential on the opposite side of the capacitor C1 (in other words, on the side of the rectifier 1) of the reactor L1 is taken as a reference, a harmonic component in phase with the harmonic component of the DC voltage Vdc appears in the voltage VL.

Therefore, when the potential on the side of the capacitor C1 is taken as a reference, for example, a correction is made so that the voltage control rate ks can decrease as the voltage VL becomes higher, and when the potential on the opposite side is taken as a reference, a correction is made so that the voltage control rate ks can increase as the voltage VL becomes higher. The correction can be thereby made so that the voltage control rate ks can increase as the harmonic component of the DC voltage Vdc becomes higher.

A conventional correction of the voltage control rate ks is described more specifically in case of adopting the voltage VL taking the potential on the side of the capacitor C1 as a reference. A corrected voltage control rate command ks* is calculated by subtracting a correction amount H obtained by multiplying the voltage VL by a predetermined gain K (=K·VL) from an uncorrected voltage control rate command ks**. When this is formulated, the following equation is derived.

$$ks^* = ks^{**} - K \cdot VL \tag{1}$$

Accordingly, the voltage control rate command ks* can decrease as the voltage VL becomes higher. Therefore, a correction can be made so that the voltage control rate command ks* is made larger as the harmonic component of the DC voltage Vdc becomes larger.

The gain K is a parameter to determine a ratio at which the voltage control rate command ks* decreases with respect to the value of the voltage VL, in other words, the harmonic component of the DC voltage Vdc. The correction amount (a reduction amount of the voltage control rate command ks*) is made larger as the gain K becomes larger.

When the voltage VL taking the potential on the side of the rectifier 1 as a reference is adopted, the corrected voltage control rate command ks* is calculated by adding the correction amount H to the uncorrected voltage control rate command ks**. When this is formulated, the following equation is derived.

$$ks^* = ks^{**} + K \cdot VL \tag{2}$$

The ratio of the gain K to the voltage control rate command ks (K/ks) is made larger as the voltage control rate command ks becomes smaller. When the gain K is too large for the voltage control rate command ks, a stability of the VL control system may be impaired.

Thus, in the present embodiment, a correction coefficient α which is made smaller as the voltage control rate command ks becomes smaller is introduced. In more detail, a product of the voltage VL, the gain K, and the correction coefficient α is taken as the correction amount H, and this correction amount H is subtracted from the voltage control rate command ks. When this is formulated, the following equation is derived. Although a case where the potential on the side of the capacitor C1 is taken as the reference of the voltage VL of the reactor is described below as an exemplary case, the equation (2) may also be used.

$$ks^* = ks^{**} - \alpha \cdot K \cdot VL \qquad (3)$$

The product of the correction coefficient α and the gain K, which serves as the coefficient of the voltage VL, may be understood as the correction coefficient (α·K). This correction coefficient (α·K) also serves as a gain of the voltage VL. Herein, the correction coefficient (α·K) is also made smaller as the voltage control rate command ks** becomes smaller.

According to the equation (3), the correction coefficient (α·K) is also made smaller as the voltage control rate command ks becomes smaller. Thus, an increase in the ratio of the correction coefficient to the voltage control rate command ks (=α·K/ks) can be suppressed compared with the conventional technique. In other words, the correction coefficient can be suppressed from becoming too large for the voltage control rate command ks. Thus, the instability of the control can be suppressed.

A value proportional to the voltage control rate command ks**, for example, may be taken as the correction coefficient α. According to this case, the correction coefficient α can be simply calculated.

<3. Control Configuration>

A specific control configuration is described. As shown in FIG. 1, the present power conversion apparatus is provided with a reactor voltage detector 4. The reactor voltage detector 4 detects the voltage VL of the reactor L1, and performs, for example, an analog-digital conversion on the voltage VL to output the converted voltage VL to the controller 3. Herein, as an exemplary case, the voltage VL is a voltage taking a potential on the side of the capacitor C1 among the potentials of both ends of the reactor L1 as a reference. The voltage VL detected by the reactor voltage detector 4 is used for the correction of the voltage control rate ks.

The present power conversion apparatus is also provided with a current detector 5. The current detector 5 detects the alternating current outputted by the power converter 2 (the alternating current flowing through the load M1), and performs, for example, an analog-digital conversion on the alternating current to output the converted alternating current to the controller 3. The exemplary case of FIG. 1 shows that the power converter 2 outputs three phase (U-phase, V-phase, and W-phase) alternating currents and the two phase (U-phase and V-phase) alternating currents iu and iv are detected among three phase alternating current. Since a sum of the three phase alternating currents is ideally to be zero, the controller 3 can calculate the remaining one phase alternating current iw from the two phase alternating currents iu and iv. These currents are appropriately used by a known method to generate the switching signal S.

As shown in FIG. 1, the controller 3 includes a harmonic suppression controller 31, a voltage control rate corrector 32, and a switching signal generator 33.

The controller 3 includes, for example, a microcomputer and a memory device. The microcomputer executes process steps (in other words, procedures) described in a program. The above memory device can be constituted of one or a plurality of memory devices such as a ROM (Read Only Memory), a RAM (Random Access Memory), a rewritable nonvolatile memory (EPROM (Erasable Programmable ROM) or the like), a hard disk unit, and the like. The memory device stores therein various information and data and the like, also stores therein a program to be executed by the microcomputer, and provides a work area for execution of the program. Further, it can be grasped that the microcomputer functions as various means corresponding to the process steps described in the program, or that the microcomputer implements various functions corresponding to the process steps. Furthermore, the controller 3 is not limited to this type but some or all of the procedures executed by the controller 3, or some or all of the means or functions implemented by the controller 3 may be achieved by hardware.

The harmonic suppression controller 31 is a function unit to suppress the harmonic component of the DC voltage Vdc. The harmonic suppression controller 31 receives the voltage control rate command ks** and the voltage VL and calculates, on the basis of them, the above correction amount H used for the harmonic suppression.

Figure 2:
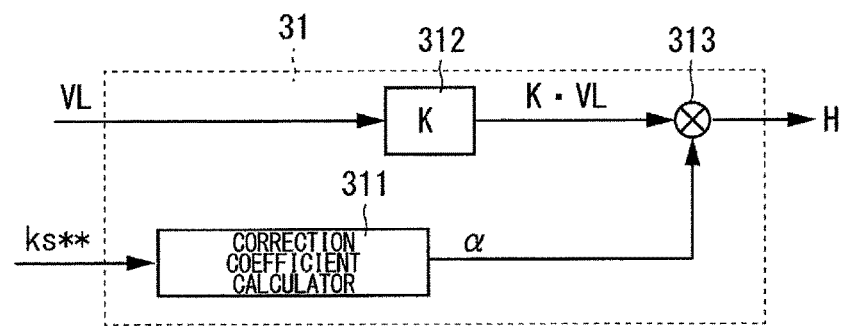
FIG. 2 is a view showing an exemplary conceptual configuration of a controller.

FIG. 2 is a functional block diagram showing an exemplary case of a particular internal configuration of the harmonic suppression controller 31. The harmonic suppression controller 31 includes a correction coefficient calculator 311, a gain unit 312, and a multiplier 313.

The voltage control rate command ks is inputted to the correction coefficient calculator 311. The correction coefficient α calculated by the correction coefficient calculator 311 is made smaller as the voltage control rate command ks becomes smaller. For example, the voltage control rate command ks** is multiplied by a predetermined proportionality coefficient (>0) so that the correction coefficient α is calculated. This correction coefficient α is outputted to the multiplier 313.

The gain unit 312 receives the voltage VL. Then, the gain unit 312 multiplies the voltage VL by the gain K and output the result to the multiplier 313.

The multiplier 313 receives the result (K·VL) outputted from the gain unit 312 and the correction coefficient α. Then the multiplier 313 multiplies the result by the correction coefficient α to calculate the correction amount H (=α·K·VL) and then outputs this correction amount H to the voltage control rate corrector 32.

With reference to FIG. 1 again, the voltage control rate corrector 32 inputs the correction amount H and the voltage control rate command ks** and outputs the voltage control rate command ks*. The voltage control rate corrector 32 subtracts the correction amount H from the voltage control rate command ks** to calculate the voltage control rate command ks*. The voltage control rate command ks* is outputted to the switching signal generator 33.

The switching signal generator 33 generates, on the basis of a well-known method (for example, Japanese Patent No. 4067021), a voltage command (for example, a d-axis voltage command and a q-axis voltage command in a d-q axis rotating coordinate system) for the AC voltage outputted by the power converter 2. Then, for example, a correction is made by multiplying the voltage command by the voltage control rate command ks*. Subsequently, the switching signal S is generated by a well-known method (for example, a method of performing a coordinate conversion on the corrected voltage command so that the corrected voltage command is converted into the three-phase voltage command, and then comparing the three-phase voltage command and a carrier) based on the corrected voltage command. The switching signal S is outputted to the power converter 2.

Accordingly, the AC voltage based on the voltage control rate command ks* is outputted. Thus, the harmonic component of the DC voltage Vdc can be suppressed. Moreover, since the correction coefficient α (or α·K) is made smaller as the voltage control rate command ks becomes smaller, an increase in the ratio of the correction coefficient α (or α·K) to the voltage control rate command ks can be suppressed. Thus, the instability of the control caused by the increase can be suppressed.

The Second Embodiment

The second embodiment is different from the first embodiment in the calculation method of the correction coefficient α. In the second embodiment, when the voltage control rate command ks is smaller than a predetermined value, the correction coefficient α is calculated to be made smaller as the voltage control rate command ks becomes smaller as is the case with the first embodiment, and in the meanwhile, when the voltage control rate command ks** is larger than the predetermined value, the correction coefficient α is calculated to be made larger as the amplitude of the alternating current becomes smaller. The predetermined value is previously determined by, for example, an experiment or a simulation.

In a region where the voltage control rate command ks is larger than the predetermined value (hereinafter, referred to also as a high load region), the ratio of the correction coefficient (the gain K) to the voltage control rate command ks is comparatively small even when the conventional equation (1) is adopted. Thus, in the high load region, the increase of the ratio does not impair the stability of the VL control system easily.

In the meanwhile, the stability of the VL control system in the high load region is largely influenced by the variation of gain (the gain here indicates a largeness of a transfer function, referred to a transfer gain hereinafter) in the VL control system in accordance with the variation of amplitude of the alternating current. The transfer gain is described in detail hereinafter.

Hereinafter, a case of α=1 is described first, and then a case of α=α2 (α2 is made larger as the amplitude of the alternating current becomes smaller) is described, for the explanation in an orderly sequence.

Figure 3:
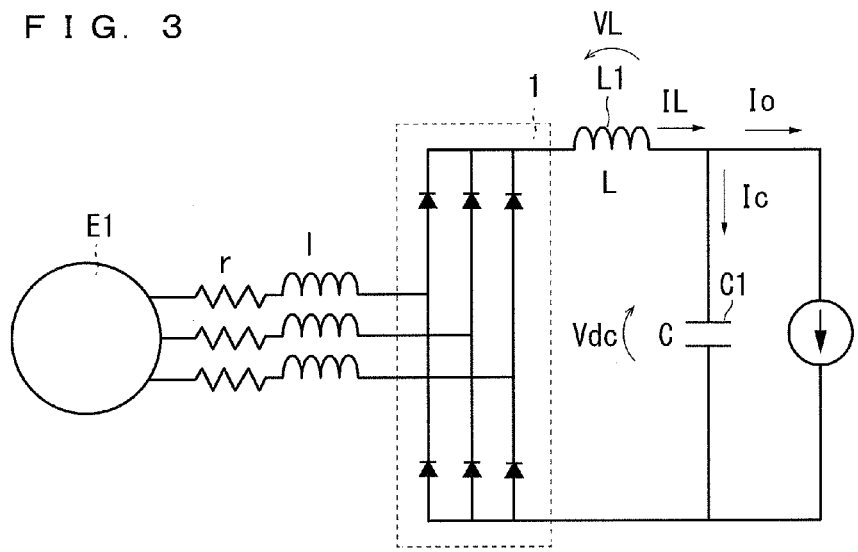
FIG. 3 is a view showing an exemplary equivalent circuit.
Figure 7:
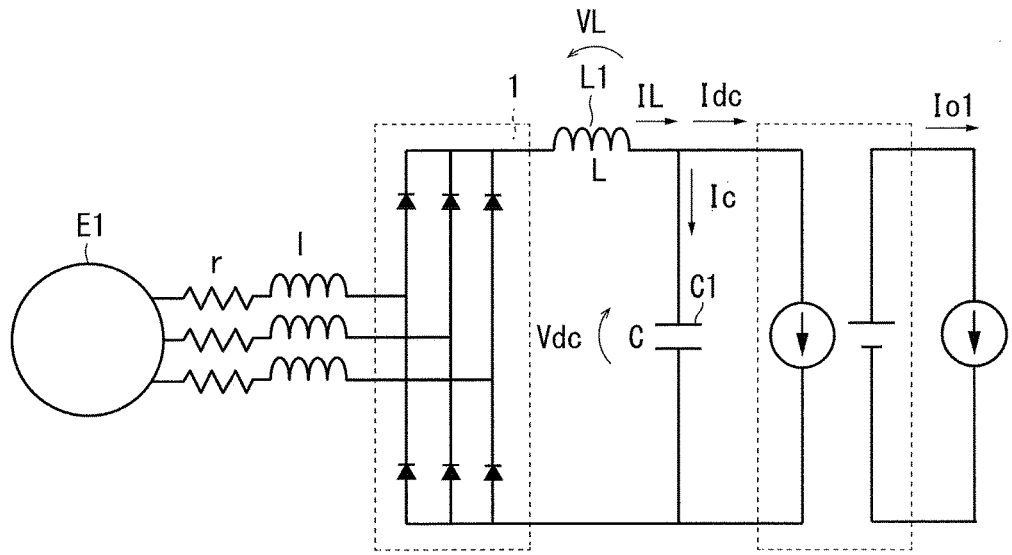
FIG. 7 is a view showing an exemplary equivalent circuit.

FIG. 3 shows a simplified equivalent circuit in the power conversion apparatus of FIG. 1. Herein, the transfer function in an equivalent circuit of FIG. 7 is derived in consideration of the transfer function using the simplified equivalent circuit of FIG. 3. In the exemplary case of FIG. 3, it is grasped that the load M1 is an inductive load and a subsequent stage after the power converter 2 is a current source. Further, since the source impedance between the AC power supply E1 and the rectifier 1 also has an effect on the resonance frequency of the LC filter, the source impedance is also shown in the equivalent circuit of FIG. 3.

Herein, the resistance value and the inductance of the source impedance, the inductance of the reactor L1, and the capacitance of the capacitor C1 are represented by "r", "l", "L", and "C", respectively. A current flowing in the reactor L1, a current flowing in the capacitor C1, and a current flowing in the current source are represented by "IL", "Ic", and "Io", respectively. These quantities are indicated near the corresponding constituent elements in FIG. 3.

Figure 4:
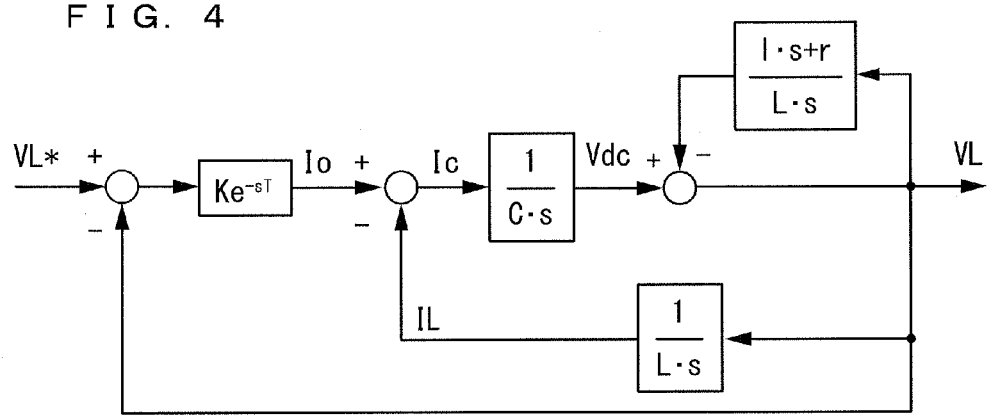
FIG. 4 is a view showing an exemplary block diagram.

FIG. 4 shows a block diagram of the VL control system. In the present control method, the harmonic component (in opposite phase with the voltage VL) of the DC voltage Vdc is reduced by the correction of the voltage control rate command on the basis of the voltage VL. Therefore, there is a concept of feedback in which a control is performed to approximate the voltage VL to a target value. Herein, since the stability of the VL control system is taken into consideration, FIG. 4 shows a block diagram of a feedback control system for the voltage VL.

An exemplary case of FIG. 4 shows "$K \cdot e^{-st}$" as a dead time element. This exemplary case shows an element caused by a dead time t from a time when the voltage VL is detected until the control based on the voltage VL is reflected. In other words, the dead time t shows a time period from the time when the voltage VL is detected until the power converter 2 outputs the AC voltage based on the switching signal S which is generated using the voltage control rate command ks* (=ks**−K·VL).

Figure 5:
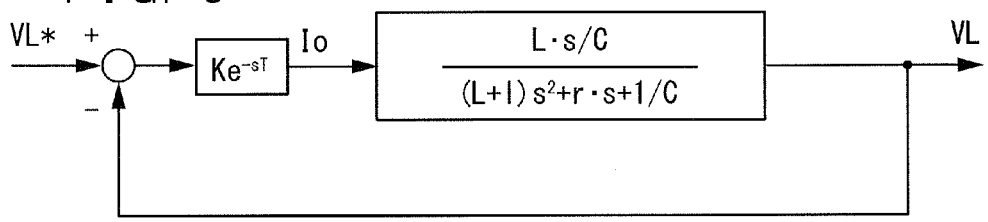
FIG. 5 is a view showing an exemplary block diagram.
Figure 6:
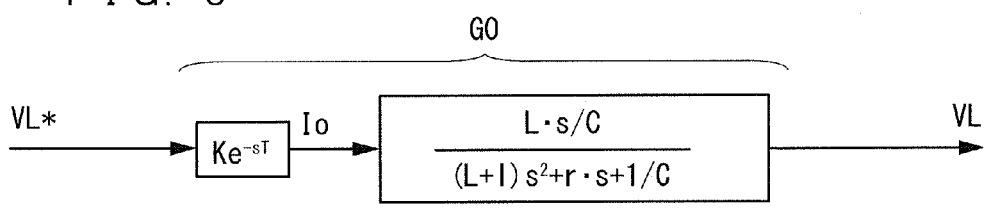
FIG. 6 is a view showing an exemplary block diagram.

When a well-known conversion is performed on the block diagram of FIG. 4, the block diagram of FIG. 5 is derived. Thus, an open-loop transfer function G0 is shown by a block diagram of FIG. 6. The open-loop transfer function G0 is a product of equations indicated by the two elements in FIG. 6.

Next, as shown in FIG. 7, it is grasped that the power converter 2 is divided into a current source and a voltage source. The load M1, which is the inductive load, is grasped as a current source.

In the equivalent circuit, the DC voltage Vdc to be inputted to the power converter 2 and the amplitude Vm of the output voltage of the power converter 2 satisfy the following equation.

$$Vm = (ks - K \cdot VL) \cdot Vdc \qquad (4)$$

Further, ideally, an electric power on the input side of the power converter 2 and an electric power on the output side thereof are equal to each other. Herein, when a power factor on the output side of the power converter 2 (a so-called load power factor) is assumed to be 1, for simplification, the following equation is true.

$$\sqrt{3} \cdot Vrms \cdot Irms = Vdc \cdot Idc \qquad (5)$$

In the equation (5), "Vrms" represents an effective value of the output voltage of the power converter 2, "Irms" represents an effective value of the output current (the alternating current flowing through the load M1) of the power converter 2, and "Idc" represents the direct current to be inputted to the power converter 2. Herein, as an exemplary case, it is assumed that the power converter 2 outputs a three-phase AC voltage. Therefore, in the left side of the equation (5), √3 is present as a factor. Further, a current Io1 of the equivalent circuit is grasped as an effective value and understood to be equal to the effective value Irms. In the block diagram described later, the current Io1 of the equivalent circuit is used instead of the effective value Ims.

Further, the amplitude Vm and the effective value Vrms of the output voltage satisfy the following equation.

$$Vm = \sqrt{2} \cdot Vrms \qquad (6)$$

When the effective value Vrms and the amplitude Vm are deleted by using the equations (4) to (6), the following equation is derived.

$$\sqrt{(3/2)} \cdot (ks - K \cdot VL) \cdot Vdc \cdot Irms = Vdc \cdot Idc \qquad (7)$$

When both sides are multiplied by a reciprocal of the DC voltage Vdc, respectively, the following equation is derived.

$$\sqrt{(3/2)} \cdot ks \cdot Irms - \sqrt{(3/2)} \cdot Irms \cdot (K \cdot VL) = Idc \qquad (8)$$

The first term in the left side of the equation (8) is a certain component of the direct current Idc and is the direct current Idc in a case where the correction is not made on the voltage control rate command. Therefore, when the direct current Idc in a case where the correction is made on the voltage control rate command is represented as a direct current Idc' to distinguish it from one on which the correction is not made, the following equation is derived.

$$Idc - \sqrt{(3/2)} \cdot Irms \cdot (K \cdot VL) = Idc' \qquad (9)$$

Since the second term in the left side of the equation (9) includes a correction amount (K·VL) for the voltage control rate ks as a factor, the second term is a variation component caused by the correction based on the voltage VL. Further, since the harmonic component of the DC voltage Vdc appears in the voltage VL, the second term can be grasped as a variation component based on the harmonic component of the DC voltage Vdc. The second term also includes the effective value Irms of the output current as a factor.

Thus, the correction of the voltage control rate ks on the basis of the voltage VL means the correction on the direct current Idc. Then, the direct current Idc is necessarily affected by the effective value Irms. Specifically, the correction is made by subtracting a result (product) obtained by multiplying the correction value (K·VL) based on the voltage VL by the coefficient $\sqrt{(3/2)} \cdot Irms$ based on the effective value Irms from the direct current Idc.

Figure 8:
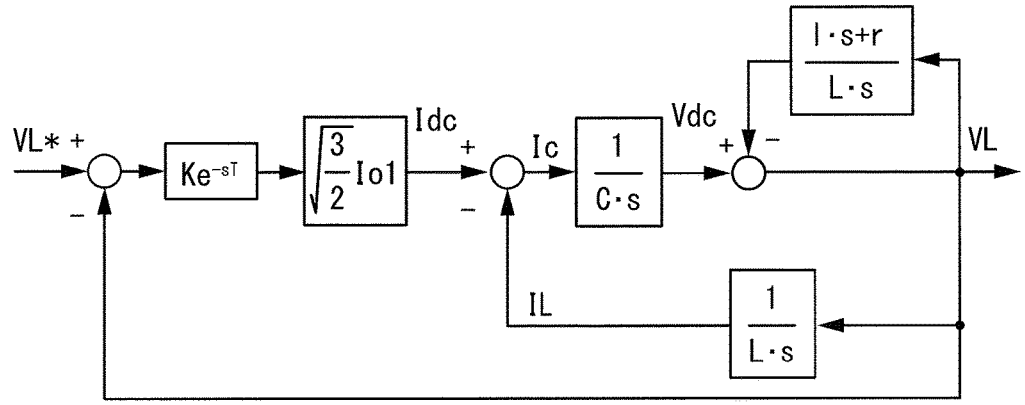
FIG. 8 is a view showing an exemplary block diagram.
Figure 9:
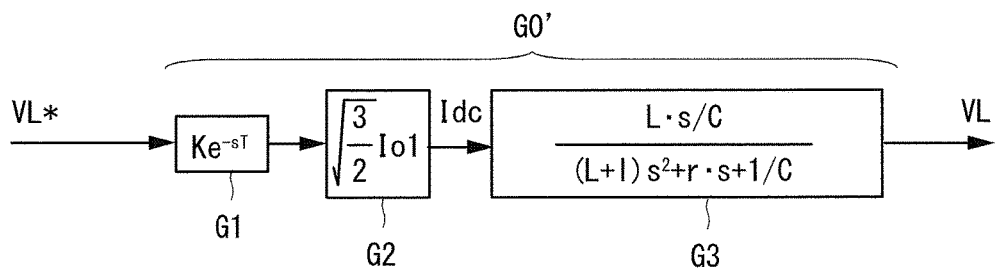
FIG. 9 is a view showing an exemplary block diagram.

Since the value obtained by multiplying the value (K·VL) by $\sqrt{(3/2)} \cdot Irms$ is the correction amount for the direct current Idc, the block diagram of the VL control system has a configuration in which the element of "$\sqrt{(3/2)} \cdot Io1$" (herein, Io1=Irms) is added to the block diagram of FIG. 5, as shown in FIG. 8. When the block diagram of FIG. 8 is converted in order to obtain an open-loop transfer function G0', the block diagram of FIG. 9 is derived. The block diagram of FIG. 9 have a configuration in which an element of "$\sqrt{(3/2)} \cdot Io1$" is added to the block diagrams of FIG. 6. Hereinafter, transfer functions having elements of "$K \cdot e^{-s\tau}$", "$\sqrt{(3/2)} \cdot Io1$", and "$(L \cdot s/C)/\{(L+1)\, s^2 + r \cdot s + 1/C\}$" are referred to as G1 to G3, respectively.

Figure 10:
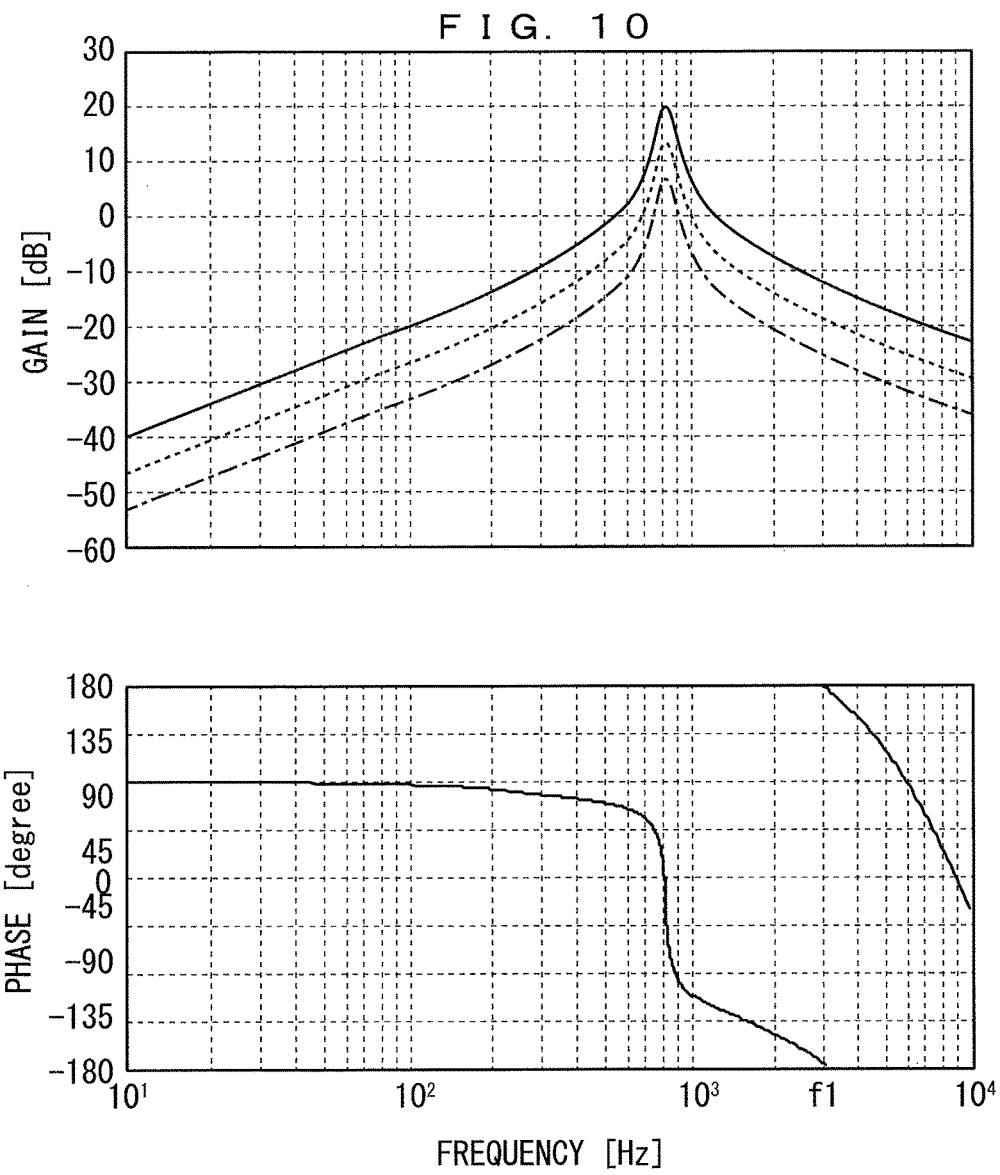
FIG. 10 is a view showing exemplary transfer gain and phase of an open-loop transfer function.

As can be understood from the block diagram of FIG. 9, a transfer gain (dB) of the open-loop transfer function G0' is a sum of the transfer gains (dB) of the transfer functions G1 to G3. Since the transfer function G2 is proportional to the effective value Irms (=Io1), the transfer gain of the open-loop transfer function G0' varies with the effective value Irms. FIG. 10 shows transfer gains and phases of the open-loop transfer function G0' when the effective value Irms is 5 A, 10 A, and 20 A. In FIG. 10, the transfer gains when the effective value Irms is 5 A, 10 A, and 20 A are indicated by a one-dot chain line, a dotted line, and a solid line, respectively. Since the effective value Irms is positive, the transfer gain increases as the effective value Irms becomes larger, as shown in FIG. 10.

On the other hand, since the transfer function G2 is a real number, the phase thereof is 0 degree. Therefore, even when the effective value Irms varies, the phase of the open-loop transfer function G0' is not affected thereby. Thus, in FIG. 10, the phases of the open-loop transfer function G0' when the effective value Irms is 5 A, 10 A, and 20 A are indicated by a solid line in common. Accordingly, the frequency f1 when the phase of the open-loop transfer function G0' takes −180 degrees does not depend on the effective value Irms.

Thus, though the frequency f1 does not vary with the effective value Irms, the transfer gain increases as the effective value Irms becomes larger. Therefore, the gain margin (an absolute value of the transfer gain when the phase takes −180 degrees) decreases as the effective value Irms becomes larger, and this may invite instability of the control.

Then, in the second embodiment, the voltage control rate ks is corrected as follows in the high load region. Specifically, a correction coefficient α2 (<1) which increases as the effective value Irms of the alternating current becomes smaller is adopted. When this is expressed by an equation, the following equation is derived.

$$ks^* = ks^{**} - \alpha 2 \cdot K \cdot VL \qquad (10)$$

By adopting such a correction, the equation (9) is changed to the following equation. In other words, the equation (9) corresponds to the case of adopting α=1 in the equation (3), and an equation (11) corresponds to the case of adopting α=α2 in the equation (3).

$$Idc - \sqrt{(3/2)} \cdot Irms \cdot \alpha 2 \cdot (K \cdot VL) = Idc' \qquad (11)$$

Figure 11:
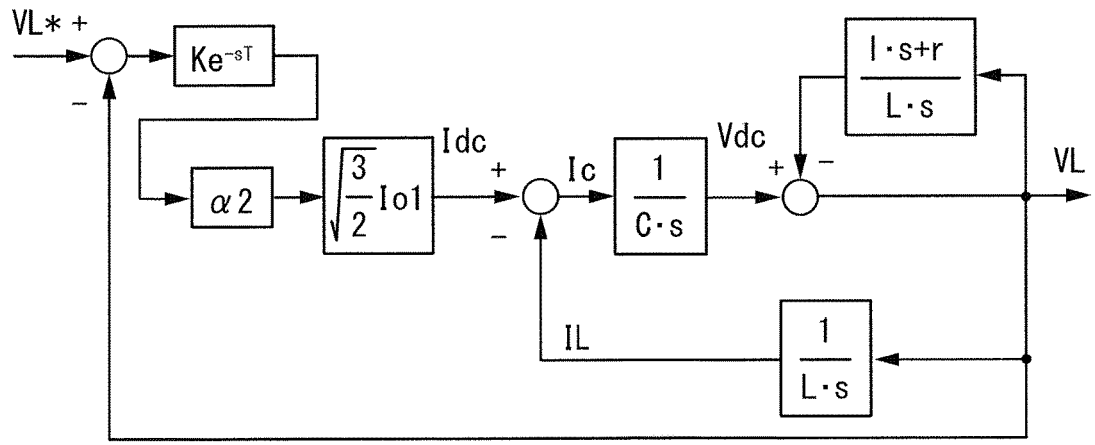
FIG. 11 is a view showing an exemplary block diagram.
Figure 12:
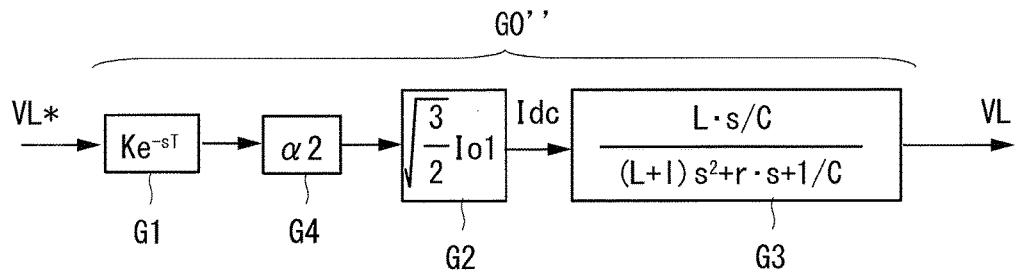
FIG. 12 is a view showing an exemplary block diagram.

Since a second term in the left side of the equation (12) is the correction amount, the block diagram of the VL control system in the case where the above correction is adopted has a configuration in which an element of "α2" is added to the block diagram of FIG. 8, as shown in FIG. 11. When the block diagram of FIG. 11 is converted in order to obtain the open-loop transfer function G0", a block diagram of FIG. 12 are derived. The block diagram of FIG. 12 has a configuration in which the element of "α2" is added to the block diagram of FIG. 9. Hereinafter, a transfer function of the above element will be referred to as a transfer function G4.

Therefore, the transfer gain of the open-loop transfer function G0" is a sum of the transfer gain of the transfer functions G1 to G4. Since the correction coefficient α2 is smaller than 1, the transfer gain of the transfer function G4 has a negative value when a unit dB is adopted. Further, since the correction coefficient α2 takes a smaller value as the effective value Irms becomes larger, the transfer gain of the transfer function G4 also decreases as the effective value Irms becomes larger. Therefore, even when the transfer gain of the transfer function G2 increases as the increase of the effective value Irms, the transfer gain of the transfer function G4 decreases, so that the increase of the transfer gain of the open-loop transfer function G0" can be suppressed. Accordingly, the reduction in the gain margin due to the increase in the effective value Irms can be suppressed, and this can contribute to the stability of the control.

It is desirable that a reciprocal of the effective value Irms (1/Irms) should be adopted as the correction coefficient α2. In other words, it is desirable that a correction should be made by subtracting a product of the voltage VL, the gain K, and the reciprocal of the effective value Irms (the correction amount H) from the voltage control rate command ks**. As can be understood from the block diagram of FIG. 12, it is thereby possible to cancel the effective value Irms by multiplication of the correction coefficient α2 and the effective value Irms. Therefore, in this case, it is possible to avoid the variation in the transfer gain of the open-loop transfer function G0" due to the variation in the effective value Irms. Accordingly, the gain margin does not decrease even when the effective value Irms increases, and this can contribute to the stability of the control.

Further, even when the effective value Irms is cancelled as the correction coefficient α2 in the block diagram of FIG. 12, $\sqrt{(3/2)}$ remains. This can be regarded as an offset of the transfer gain when the unit dB is adopted. In order to also cancel $\sqrt{(3/2)}$, $\sqrt{(2/3)}$/Irms should be adopted as the correction coefficient α2. This makes the sum of the transfer gains (dB) of the transfer functions G3 and G4 zero (the value of the transfer gain is 1).

Further, $\sqrt{3}$ in the equation (12) arises from $\sqrt{3}$ in the equation (5). Therefore, when the power converter 2 outputs a single-phase AC voltage, $\sqrt{2}$/Irms should be adopted as the correction coefficient α2.

As described above, in the high load region where the voltage control rate command ks is larger than the predetermined value, the correction coefficient α2 which is made larger as the amplitude of the alternating current becomes smaller is adopted. In other words, in the high load region where the ratio of the correction coefficient (α·K) to the voltage control rate command ks is comparatively small and thus the instability due to the ratio does not easily occur, the correction coefficient α2 is adopted to suppress not the instability of the control due to the ratio but the instability of the control due to the increase in the amplitude of the alternating current.

In the meanwhile, in the low load region where the voltage control rate command ks** is smaller than the predetermined value, the correction coefficient α described in the first embodiment is adopted to suppress the instability of the control due to the ratio.

Accordingly, the second embodiment enables the stability of the control effectively in the low load region and the high load region.

<Configuration>

Figure 13:
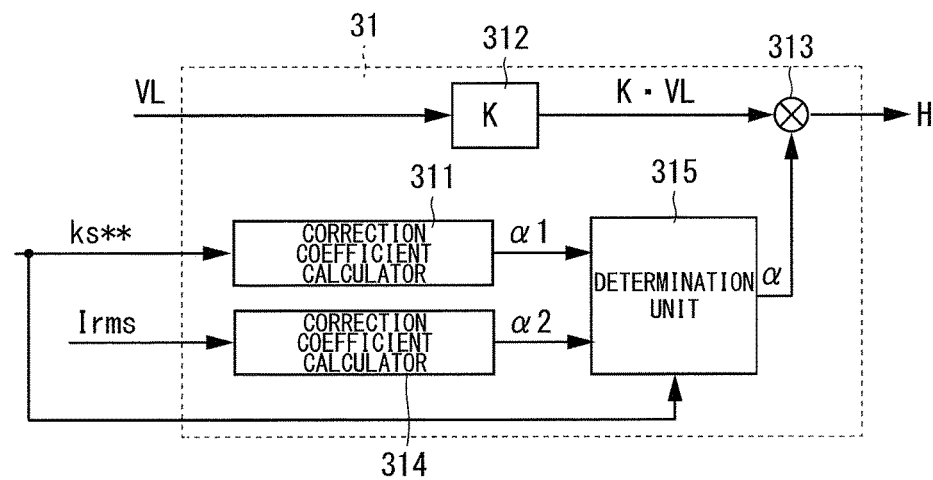
FIG. 13 is a view showing an exemplary block diagram.

The power conversion apparatus according to the second embodiment is different from the power conversion apparatus of FIG. 1 in the internal configuration of the harmonic suppression controller. FIG. 13 is a functional block diagram conceptually showing an exemplary case of an internal configuration of the harmonic suppression controller 31 according to the second embodiment. The harmonic suppression controller 31 further includes a correction coefficient calculator 314 and a determination unit 315 compared with the harmonic suppression controller 31 of FIG. 2.

The correction coefficient calculator 314 receives the effective value Irms of the alternating current flowing through the load M1. The correction coefficient calculator 314 calculates the correction coefficient α2 which increases as the effective value Irms becomes smaller. For example, a correction coefficient α2 which is inversely proportional to the effective value Irms is calculated.

Hereinafter, the correction coefficient α calculated by the correction coefficient calculator 311 is referred to as a correction coefficient α1, and the correction coefficient which sums up the correction coefficients at and α2 is referred to as the correction coefficient α. As described in the first embodiment, the correction coefficient α1 is calculated to be made smaller as the voltage control rate command ks becomes smaller. For example, the correction coefficient α1 is proportional to the voltage control rate command ks.

The correction coefficients α1 and α2 are inputted to the determination unit 315. The voltage control rate command ks is also inputted to the determination unit 315. Then, the determination unit 315 selects one of the correction coefficients al and α2 in accordance with the voltage control rate command ks. In more detail, the determination unit 315 selects the correction coefficient α1 when the voltage control rate command ks is smaller than the predetermined value, and outputs the correction coefficient α1 as the correction coefficient α to the multiplier 313. In the meanwhile, the determination unit 315 selects the correction coefficient α2 when the voltage control rate command ks is larger than the predetermined value, and outputs the correction coefficient α2 as the correction coefficient α to the multiplier 313. The predetermined value is previously determined by an experiment or a simulation and is stored in the determination unit 315, for example.

The multiplier 313 multiplies the result (K·VL) outputted from the gain unit 312 by the correction coefficient α in the same manner as the first embodiment to calculate the correction amount H and then outputs this correction amount H to the voltage control rate corrector 32.

Accordingly, in the high load region where the voltage control rate command ks is larger than the predetermined value, the correction coefficient α2 is adopted as the correction coefficient α, and in the low load region where the voltage control rate command ks is smaller than the predetermined value, the correction coefficient α1 is adopted as the correction coefficient α.

<Description of Effect>

Figure 14:
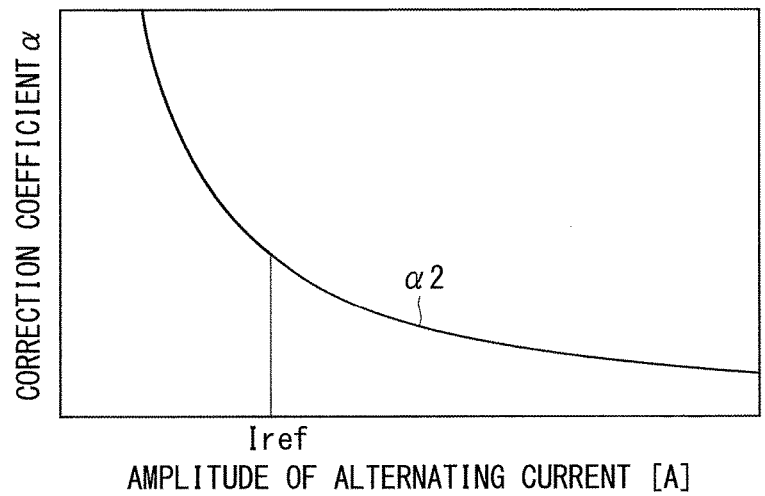
FIG. 14 is a view showing an exemplary relationship between a correction coefficient and an amplitude of an alternating current.

When the correction coefficient α2 which is inversely proportional to the amplitude of the alternating current is adopted regardless of the low load region and the high load region, the correction coefficient α2 becomes extremely large in the low load region (refer to FIG. 14). Herein, for simplification, the current is considered to be small in the low load region. In this case, the ratio of the correction coefficient to the voltage control rate command ks** increases, and the VL control system may be unstable. Thus, different from the present embodiment, it is considered that the correction coefficient α is set to zero in the low load region. In this case, the voltage control rate is not corrected in the low load region. Thus, the harmonic component of the DC voltage Vdc cannot be reduced in the low load region. FIG. 15 schematically shows exemplary input current and DC voltage Vdc of the rectifier 1 in the low load region when the voltage control rate is not corrected in the low load region.

Figure 16:
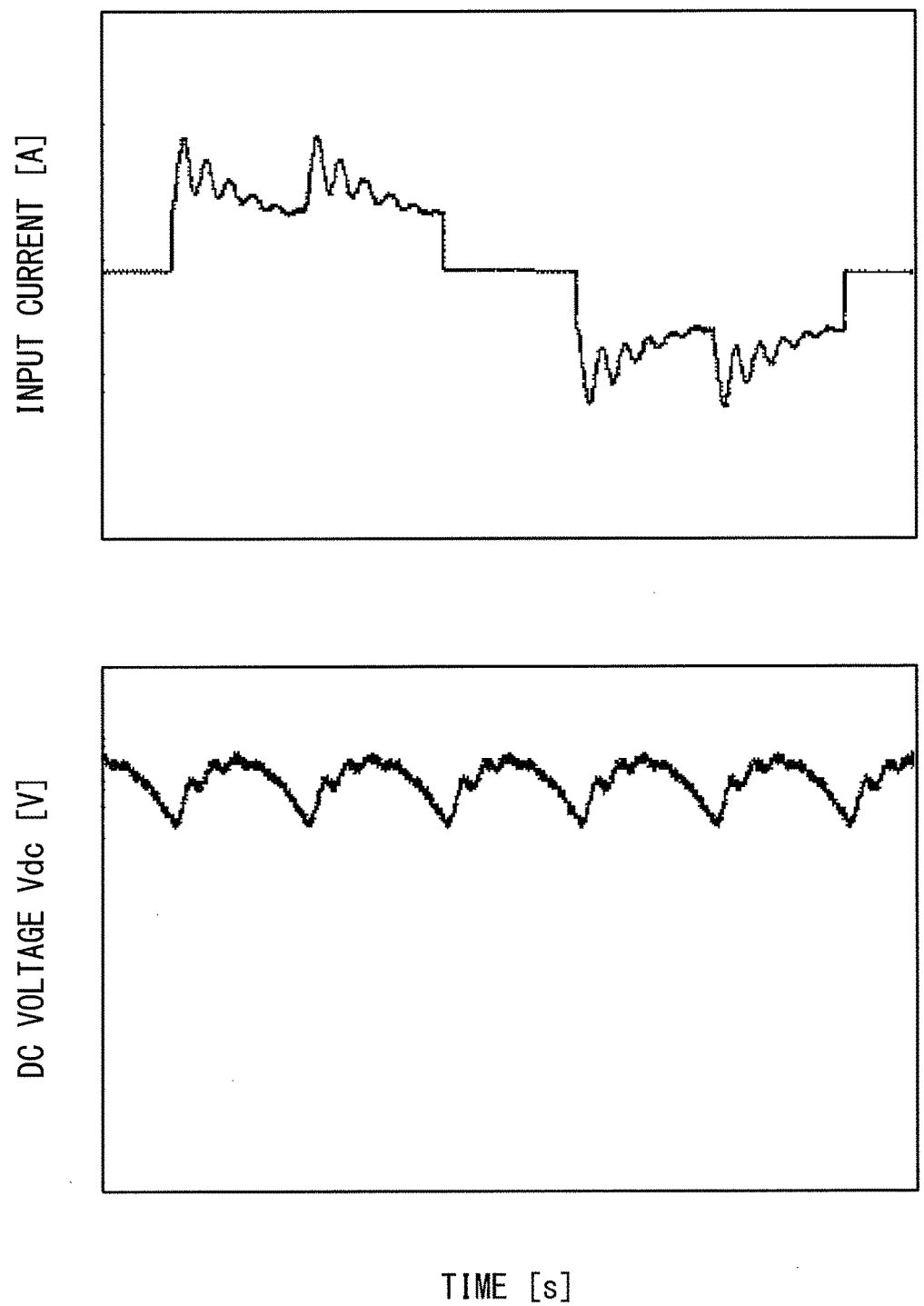
FIG. 16 is a view showing exemplary input current and direct current.

In the meanwhile, in the present embodiment, the voltage control rate ks is corrected also in the low load region. Thus, the harmonic component of the DC voltage Vdc can be reduced also in the low load region. FIG. 16 schematically shows exemplary input current and DC voltage Vdc of the rectifier 1 in the low load region when the voltage control rate is corrected in the low load region as in the present embodiment.

As can be understood from a comparison of FIGS. 15 and 16, the present embodiment enables the reduction of the harmonic component of the DC voltage Vdc, thereby also enabling the reduction of the harmonic component of the input current.

When the correction coefficient α is set to zero in the low load region, the input current and the DC voltage Vdc change comparatively largely at a boundary between the low load region and the high load region. The reason is that the harmonic component is large in the low load region, whereas the harmonic component decreases in the high load region. Such a change causes a vibration.

In the meanwhile, the present embodiment enables the reduction of the harmonic component in both the low load region and the high load region. Thus, a waveform of the input current and the direct current does not largely change around the boundary between the low load region and the high load region. Accordingly, the above vibration can be suppressed.

The Third Embodiment

As can be understood from the equation (3), the ratio of the correction amount H to the voltage control rate command ks** is made larger as the voltage VL becomes larger. When this ratio is too large, the stability of the control may be impaired.

Thus, in the third embodiment, it is considered that a limitation is set on the correction amount H (=α·K·VL). Considering that the harmonic component of the DC voltage Vdc appears in the voltage VL, the voltage VL takes positive and negative values. Thus, when the correction amount H is larger than a positive upper limit value HPlimit, the correction amount H is limited to the upper limit value HPlimit, and when correction amount H is smaller than a negative lower limit value HMlimit, the correction amount H is limited to the lower limit value HMlimit. For example, absolute values of the upper limit value HPlimit and lower limit value HMlimit can be equal to each other. Herein, in accordance with the above limitation, the absolute value of the correction amount H is limited to a limit value Hlimit (=HPlimit=|HMlimit|).

Figure 18:
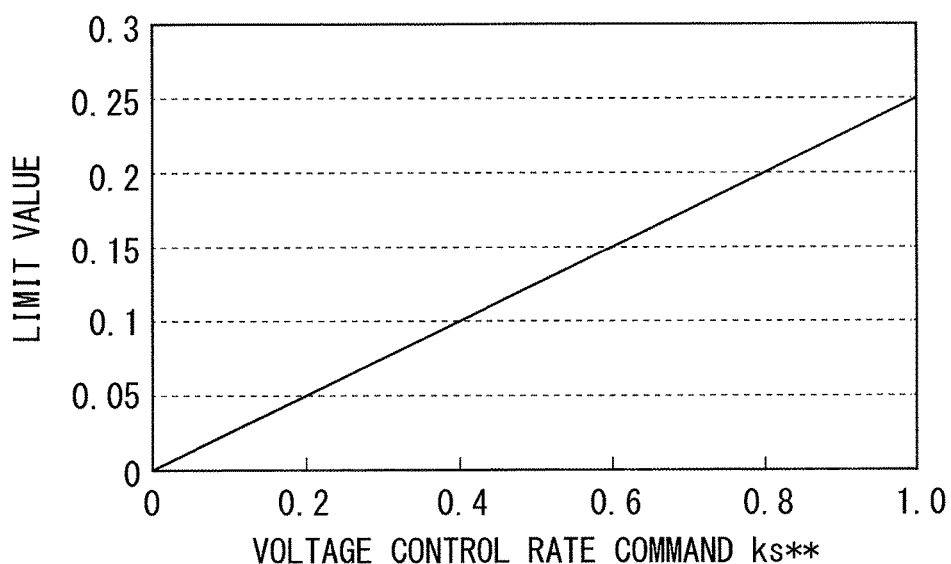
FIG. 18 is a view showing an exemplary relationship between a limit value and a voltage control rate command for a correction amount.

However, even when the correction amount H is limited to a certain value, the ratio increases as the voltage control rate command ks becomes smaller. Thus, in the third embodiment, the limit value Hlimit is set smaller as the voltage control rate command ks becomes smaller. For example, as shown in FIG. 18, the limit value Hlimit is set to be proportional to the voltage control rate command ks**. When this is formulated, the following equation is derived.

$$H\text{limit} = B \cdot ks^{**} \tag{12}$$

A proportionality coefficient B is appropriately set and, for example, a value around 0.2 to 0.25 may be adopted. Accordingly, the ratio (H/ks**) can be limited to the proportionality coefficient B or less. Thus, the instability of the control can be suppressed.

<Configuration>

Figure 17:
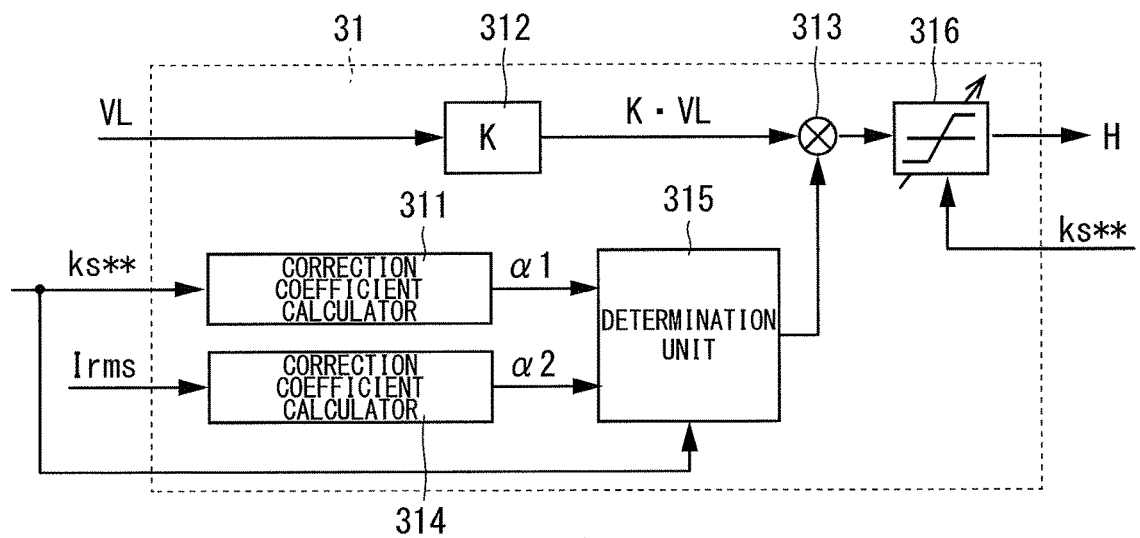
FIG. 17 is a view showing an exemplary conceptual configuration of a controller.

The power conversion apparatus according to the third embodiment is different from the power conversion apparatus of FIG. 1 in the harmonic suppression controller 31. FIG. 17 is a view showing an exemplary conceptual configuration of the harmonic suppression controller 31. The harmonic suppression controller 31 further includes a variable limiter 316 compared with the harmonic suppression controller 31 of FIG. 13. The variable limiter 316 receives the voltage control rate command ks from outside. The variable limiter 316 calculates the limit value Hlimit which is made larger as the voltage control rate command ks becomes larger. For example, the voltage control rate command ks** is multiplied by the proportionality coefficient B to calculate the limit value Hlimit.

The variable limiter 316 receives the multiplication result (α·K·VL) from the multiplier 313. When the multiplication result is larger than the upper limit value (the limit value Hlimit), the variable limiter 316 outputs the upper limit value (the limit value Hlimit) as the correction amount H, and when the multiplication result is smaller than the lower limit value (a value obtained by multiplying the limit value Hlimit by −1), the variable limiter 316 outputs the lower limit value as the correction amount H. When the calculation result is smaller than the upper limit value and larger than the lower limit value, the variable limiter 316 outputs the calculation result as the correction amount H. This correction amount H is outputted to the voltage control rate corrector 32. Accordingly, the absolute value of the correction amount H can be limited to the limit value Hlimit.

The above various embodiments can be appropriately combined as long as they do not impair each other's functions.

While the disclosure has been shown and described in detail, the foregoing description is in all aspects illustrative and not restrictive. It is therefore understood that numerous modifications and variations can be devised without departing from the scope of the disclosure.

The invention claimed is:

1. A method of controlling a power conversion apparatus which comprises:
   - a first power supply line and a second power supply line;
   - a rectifier for rectifying a first AC voltage to be inputted into a DC voltage to output said DC voltage to between said first power supply line and said second power supply line;
   - a capacitor provided between said first power supply line and said second power supply line;
   - a reactor constituting an LC filter, together with said capacitor; and
   - a power converter for converting a DC voltage supported by said capacitor into a second AC voltage based on a switching signal to be inputted and then applying said second AC voltage to a load to flow an alternating current, said method comprising:
   - detecting a voltage of said reactor taking a potential on a side of said capacitor as a reference;
   - when at least a first voltage control rate command which is a ratio of an amplitude of said second AC voltage to an average value of said DC voltage is smaller than a predetermined value, calculating a correction coefficient which is made smaller as said first voltage control rate command becomes smaller;
   - making a correction on said first voltage control rate command to subtract a correction amount obtained by multiplying said voltage of said reactor by said correction coefficient, thereby generating a second voltage control rate command; and
   - giving said switching signal which is generated based on said second voltage control rate command to said power converter.

2. The method of controlling the power conversion apparatus according to claim 1, wherein
   when said first voltage control rate command is larger than said predetermined value, said correction coefficient is calculated to be made larger as said amplitude of said alternating current becomes smaller.

3. The method of controlling the power conversion apparatus according to claim 2, wherein
   when said first voltage control rate command is larger than said predetermined value, said correction coefficient is inversely proportional to said amplitude of said alternating current.

4. The method of controlling the power conversion apparatus according to claim 1, wherein
   when said correction amount is larger than a positive upper limit value, said correction amount is limited to said positive upper limit value, and when said correction amount is smaller than a negative lower limit value, said correction amount is limited to said negative lower limit value, and
   absolute values of said positive upper limit value and said negative lower limit value are made larger as said first voltage control rate command becomes larger.

5. The method of controlling the power conversion apparatus according to claim 4, wherein said positive upper limit value or said negative lower limit value is proportional to said first voltage control rate command.

6. The method of controlling the power conversion apparatus according to claim 2, wherein
when said correction amount is larger than a positive upper limit value, said correction amount is limited to said positive upper limit value, and when said correction amount is smaller than a negative lower limit value, said correction amount is limited to said negative lower limit value, and
absolute values of said positive upper limit value and said negative lower limit value are made larger as said first voltage control rate command becomes larger.

7. The method of controlling the power conversion apparatus according to claim 6, wherein
said positive upper limit value or said negative lower limit value is proportional to said first voltage control rate command.

8. The method of controlling the power conversion apparatus according to claim 3, wherein
when said correction amount is larger than a positive upper limit value, said correction amount is limited to said positive upper limit value, and when said correction amount is smaller than a negative lower limit value, said correction amount is limited to said negative lower limit value, and
absolute values of said positive upper limit value and lower said negative limit value are made larger as said first voltage control rate command becomes larger.

9. The method of controlling the power conversion apparatus according to claim 8, wherein
said positive upper limit value or said negative lower limit value is proportional to said first voltage control rate command.

* * * * *